United States Patent [19]

Du Chateau

[11] 4,353,662

[45] Oct. 12, 1982

[54] CONSTRUCTION SYSTEM FOR RETICULATED STEEL STRUCTURES

[76] Inventor: Stephane Du Chateau, 15 Villa des Arts, 75018 Paris, France

[21] Appl. No.: 134,602

[22] Filed: Mar. 27, 1980

[30] Foreign Application Priority Data

Mar. 27, 1979 [FR] France .................. 79 07636

[51] Int. Cl.³ ............................................. F16B 7/00
[52] U.S. Cl. .................................. 403/171; 403/176; 52/648
[58] Field of Search ........................... 52/80, 81, 648; 403/217, 218, 169, 170, 171, 172, 176

[56] References Cited

FOREIGN PATENT DOCUMENTS

| 58807 | 4/1967 | German Democratic Rep. .... 52/81 |
| 841351 | 6/1952 | Fed. Rep. of Germany ...... 403/218 |
| 2305330 | 8/1973 | Fed. Rep. of Germany ........ 52/648 |

*Primary Examiner*—Andrew V. Kundrat
*Attorney, Agent, or Firm*—William A. Drucker

[57] ABSTRACT

A hollow spherical connector for securing framework members of a network structure, the connector comprising a hollow spherical main part and a closing shell part which when secured to the main part gives the connector a spherical outer configuration.

6 Claims, 1 Drawing Figure

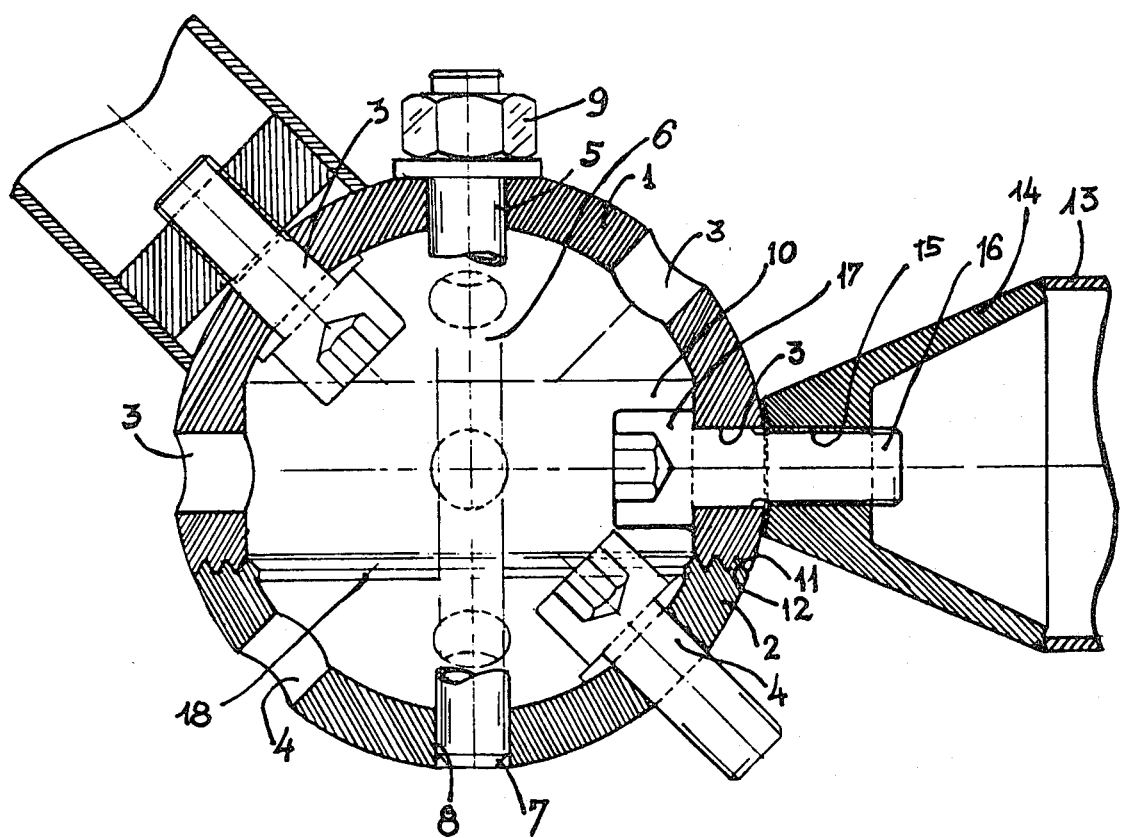

CONSTRUCTION SYSTEM FOR RETICULATED STEEL STRUCTURES

We know about reticulated steel structures that are demountable and based on spherical joints. The spheres may be partial or closed to increase their strength because a partial sphere is easily deformed. Spherical joints are well suited to three dimensional steel structures. For instance, it has been suggested that the members of a reticulated structure could be connected to a spherical joint by means of bolts screwed into the members from inside the joint, which is later closed using external bolted splices. It has also been suggested that all the members could be connected to the central ring of a spherical joint which is completed using one or two plates or shells which may complete the connection or may be of small thickness and be added for aesthetic purposes.

This invention is a general type of connection based on a demonstrable sphere satisfying the following criteria:

1. The joint is entirely demountable by bolting.
2. The connection is a hollow sphere with a perfectly regular external surface.
3. The members, which may be tubular for example, have conical ends with a threaded axial hole and are connected by bolts designed to be tightened by a hexagonal key.
4. The sphere is a closed sphere including, according to an essential characteristic of this invention, a closing spherical shell which has protruding keys on its edge which engage corresponding recesses in the edge of the principal shell to which the closing shell is connected by means of a diametral bolt passing through the sphere, this closing shell being able to receive, as for the principal shell, radially oriented members.

The invention makes it easy to assemble a demonstrable reticulated two or three dimensional structure, notably an unlimited structure in space. By using for each node, a sphere of adequate strength, the stability of the structure depends of the tensile strength of the closing bolt, so that the margin of safety can be controlled and high strength bolts can be used advantageously.

FIG. 1 is a diametral section of the example which includes a spherical node attached to a radial tubular member belonging to a reticulated steel structure.

In the example, the spherical joint with a regular external surface consists of a principal part 1 and a closing shell 2, both with radial holes, indicated respectively as 3 and 4 to allow the attachment of the members. Also part one has an opening 5 for the diametral bolt 6 which holds the two parts together. The top end 7 of this bolt is placed in opening 8 of the closing shell 2 where the end will adapt itself to nut 9.

It should be noted that the example has a partly cylindrical interior surface shown as 10. This may be preferred for more economic manufacture but it should be understood that the interior surface of part 1 can also be completely spherical.

In accordance with the invention, the edges of the two parts are profiled as shown by 11 and 12 so that the two parts fit into each other. The drawing shows a tubular radial member 13 attached to a conical end piece 14 which has an axial threaded hole 15 at its narrow end. The member is attached to the sphere with a connecting bolt 16 screwed through opening 13 into the threaded hole 15. The head 17 at bolt 16 is found on the inside of the sphere and is shaped to accept a hexagonal key. The diagram shows how a cylindrical radial member with an internal end piece can butt directly against the sphere but the tapered end piece is generally preferable as it allows the use of larger diameter bars.

After the radial members have been attached the sphere is closed by fitting nut 9 on the diametral bolt 6.

It is understood that this example and diagram do not limit the invention in any way and that we could correct various numbers of members as found at the nodes of a two or three-dimensional reticulated structure.

I claim:

1. A spherical connector for a network structure of framework members, comprising, a hollow spherically shaped main part of dimension greater than a hemisphere, annular serration profiles provided on the peripheral edge of said main parts, holes provided through the wall of said main part outside the edge area of said main part, including holes positioned in the plane of a great circle through said main part, securing bolts passing through said holes and presenting a head portion disposed inside said main part and a threaded body portion projecting from said main part and adapted to coact with an end piece of a framework member, a closing shell part of reduced size with respect of said main part and forming a sphere together with said main part, annular serration profiles provided on the edge of said shell part and adapted to fit in said annular serration profiles of the edge of the main part, holes provided through the wall of said shell part outside the edge area of the shell part, securing bolts passing through said holes on the shell part and presenting a head portion disposed inside said shell part and a threaded portion projecting from said main part and adapted to co-act with an end piece of a framework member, and a bolt passing through and connecting and securing said main part and said shell part in their assembled position, so that said connector presents a spherical shape, ensures an efficacious securing of the framework members particularly in a plane parallel to the connection plane of the two parts of the connector, and ensures a good strength against the traction and compression stresses applied in a plane parallel to said connection plane.

2. A spherical connector as recited in claim 1, wherein said connecting bolt is disposed in said shell part and extends through a hole of said main part.

3. A spherical connector as recited in claim 1, wherein said connecting bolt is disposed in said main part and extends through a hole of said shell part.

4. A framework including a spherical connector according to claim 1 and at least one framework member attachable to one of the parts by a connecting bolt having its head inside said main part and with its shaft passing through a hole in the wall of said part and screwed into a threaded socket in an end of the framework member.

5. A framework according to claim 4 in which each framework member is tubular and has an end plate with a threaded axial hole to receive the shaft of the connecting bolt.

6. A framework according to claim 5 in which the end plates are frustoconical and their narrower ends are arranged to abut the outside of the connector.

* * * * *